(12) United States Patent
Nguyen et al.

(10) Patent No.: US 10,604,875 B2
(45) Date of Patent: Mar. 31, 2020

(54) NON-TRANSITORY COMPUTER-READABLE STORAGE MEDIUM STORING SEWING DATA GENERATION PROGRAM, AND SEWING DATA GENERATION DEVICE

(71) Applicant: BROTHER KOGYO KABUSHIKI KAISHA, Nagoya-shi, Aichi-ken (JP)

(72) Inventors: Ngoc anh huyen Nguyen, Nagoya (JP); Kazutaka Imaizumi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 12 days.

(21) Appl. No.: 16/138,016

(22) Filed: Sep. 21, 2018

(65) Prior Publication Data
US 2019/0024276 A1 Jan. 24, 2019

Related U.S. Application Data

(63) Continuation of application No. PCT/JP2017/005283, filed on Feb. 14, 2017.

(30) Foreign Application Priority Data

Mar. 30, 2016 (JP) .................................. 2016-068406

(51) Int. Cl.
*D05B 19/08* (2006.01)
*D05B 19/10* (2006.01)
(Continued)

(52) U.S. Cl.
CPC ............ *D05B 19/08* (2013.01); *D05B 19/10* (2013.01); *G05B 19/4097* (2013.01); *D05C 5/02* (2013.01);
(Continued)

(58) Field of Classification Search
CPC ........ D05B 19/08; D05B 19/10; D05B 19/12; D05B 19/14; D05B 19/16
(Continued)

(56) References Cited

U.S. PATENT DOCUMENTS 5,343,401 A 8/1994 Goldberg et al.
5,701,830 A * 12/1997 Muto .................. D05B 19/10
112/102.5
(Continued)

FOREIGN PATENT DOCUMENTS

JP H08-266759 A 10/1996
JP 2000-24350 A 1/2000
(Continued)

OTHER PUBLICATIONS

May 16, 2017 International Search Report issued in International Patent Application No. PCT/JP2017/005283.

*Primary Examiner* — Nathan E Durham
(74) *Attorney, Agent, or Firm* — Oliff PLC (57) ABSTRACT

A computer-readable medium stores instructions for a processor in a sewing data generation device. When the instructions are executed, the processor acquires pattern data of embroidery pattern including partial patterns using different thread. If first common data indicating the same thread is included in first data of a first embroidery pattern and second data of a second embroidery pattern, the processor sets a sewing order in the first data, while causing the partial pattern using the thread of the first common data to be the partial pattern that is last in the sewing order in the first embroidery pattern, and sets a sewing order in the second data, while causing the partial pattern using the thread of the first common data to be the partial pattern that is first in the
(Continued)

sewing order in the second embroidery pattern that is the embroidery pattern subsequently to the first embroidery pattern.

10 Claims, 6 Drawing Sheets

(51) Int. Cl.
    *G05B 19/4097* (2006.01)
    *D05C 5/02* (2006.01)
(52) U.S. Cl.
    CPC ... *D05D 2205/085* (2013.01); *D05D 2205/18* (2013.01); *G05B 2219/36206* (2013.01); *G05B 2219/45195* (2013.01)
(58) Field of Classification Search
    USPC .................................................. 700/136–138
    See application file for complete search history.

(56) References Cited

U.S. PATENT DOCUMENTS

| | | | | |
|---|---|---|---|---|
| 5,778,808 A | * | 7/1998 | Hirata | D05B 19/04 112/102.5 |
| 5,784,987 A | * | 7/1998 | Mizuno | D05B 19/08 112/102.5 |
| 5,836,259 A | * | 11/1998 | Tanaka | D05B 19/105 112/102.5 |
| 6,012,402 A | * | 1/2000 | Sekine | D05B 19/105 112/102.5 |
| 6,237,516 B1 | * | 5/2001 | Wakayama | D05B 19/105 112/102.5 |
| 6,600,966 B1 | * | 7/2003 | Bailie | D05B 19/10 112/102.5 |
| 7,991,500 B2 | * | 8/2011 | Roos | D05B 19/08 112/102.5 |
| 8,897,909 B2 | * | 11/2014 | Yamada | D05C 5/04 112/470.01 |
| 2007/0295253 A1 | * | 12/2007 | Hayakawa | D05C 3/02 112/102.5 |
| 2010/0145494 A1 | | 6/2010 | Yamada | |
| 2010/0180809 A1 | | 7/2010 | Albano et al. | |
| 2011/0203504 A1 | * | 8/2011 | Nagai | D05B 19/12 112/102.5 |
| 2011/0218665 A1 | * | 9/2011 | Katano | D05C 5/02 700/138 |

FOREIGN PATENT DOCUMENTS

| | | |
|---|---|---|
| JP | 2002-355460 A | 12/2002 |
| JP | 2010-131272 A | 6/2010 |
| JP | 2010-179017 A | 8/2010 |

* cited by examiner

(A) SEWING ORDER (B) SEWING ORDER

(C) SEWING ORDER

PATTERN E35
PATTERN E32

PATTERN E29
PATTERN E28

PATTERN E21
PATTERN E24

(D) SEWING ORDER (E) SEWING ORDER

FIG. 6

NON-TRANSITORY COMPUTER-READABLE STORAGE MEDIUM STORING SEWING DATA GENERATION PROGRAM, AND SEWING DATA GENERATION DEVICE

CROSS-REFERENCE TO RELATED APPLICATION

This application is a Continuation Application of International Application No. PCT/JP2017/005283, filed Feb. 14, 2017, which claims priority from Japanese Patent Application No. 2016-068406, filed on Mar. 30, 2016. This disclosure of the foregoing application is hereby incorporated by reference in its entirety.

BACKGROUND

The present disclosure relates to a non-transitory computer-readable storage medium storing a sewing data generation program that generates sewing data to sew an embroidery pattern using an embroidery sewing machine, and to a sewing data generation device.

In sewing machines capable of embroidery sewing, when a plurality of embroidery patterns to be sewn using a plurality of colors are sewn, a sewing machine is known that can set a sewing order in order to efficiently perform the sewing. This sewing machine groups the plurality of embroidery patterns, and sews a pattern inside the group using each thread color at a time.

SUMMARY

In the case of sewing the plurality of embroidery patterns one by one, sufficient consideration has not been given to an efficient sewing order.

It is an object of the present disclosure to provide a non-transitory computer-readable storage medium storing a sewing data generation program and a sewing data generation device that are capable of setting a sewing order by which efficient sewing is possible, when a plurality of embroidery patterns to be sewn using a plurality of colors are sewn one by one.

Various embodiments herein provide a non-transitory computer-readable medium storing computer-readable instructions for sewing data generation that are executed by a processor provided in a sewing data generation device. When executed by the processor, the computer-readable instructions instruct the processor to perform processes. The processes include acquiring, for each of a plurality of embroidery patterns, pattern data to sew the embroidery pattern including a plurality of partial patterns which are sewn using mutually different types of thread. The pattern data includes thread data and coordinate data. The thread data indicates the type of the thread for each of the plurality of partial patterns. The coordinate data indicates positions of stitches to be sewn using the thread of the thread data. The processes further include determining whether first common data, which is the thread data indicating the same type of thread, is included in first data and second data of the plurality of embroidery patterns. The first data is the pattern data of a first embroidery pattern. The second data is the pattern data of a second embroidery pattern. The second embroidery pattern is the embroidery pattern that is sewn subsequently to the first embroidery pattern, after all the stitches included in the first embroidery pattern are sewn. The processes further include setting, when it is determined that the first common data is included in the first data and the second data, a sewing order of the stitches represented by the first data, while causing the partial pattern to be sewn using the thread of the first common data to be the partial pattern that is last in the sewing order in the first embroidery pattern. The processes further include setting, when it is determined that the first common data is included in the first data and the second data, a sewing order of the stitches represented by the second data, while causing the partial pattern to be sewn using the thread of the first common data to be the partial pattern that is first in the sewing order in the second embroidery pattern.

Various embodiments also provide a sewing data generation device including a processor and a memory. The memory stores computer-readable instructions. When executed by the processor, the computer-readable instructions instruct the processor to perform processes. The processes include acquiring, for each of a plurality of embroidery patterns, pattern data to sew the embroidery pattern including a plurality of partial patterns which are sewn using mutually different types of thread. The pattern data includes thread data and coordinate data. The thread data indicates the type of the thread for each of the plurality of partial patterns. The coordinate data indicates positions of stitches to be sewn using the thread of the thread data. The processes further include determining whether first common data is included in the pattern data of a first embroidery pattern and the pattern data of a second embroidery pattern, of the plurality of embroidery patterns. The second embroidery pattern is the embroidery pattern that is sewn subsequently to the first embroidery pattern. The first common data is the thread data indicating the same type of thread. The processes further include setting, when it is determined that the first common data is included in the pattern data of the first embroidery pattern and the pattern data of the second embroidery pattern, a sewing order of the stitches represented by the pattern data of the first embroidery pattern, while causing the partial pattern to be sewn using the thread of the first common data to be the partial pattern that is last in the sewing order in the first embroidery pattern. The processes further include setting, when it is determined that the first common data is included in the pattern data of the first embroidery pattern and the pattern data of the second embroidery pattern, a sewing order of the stitches represented by the pattern data of the second embroidery pattern, while causing the partial pattern to be sewn using the thread of the first common data to be the partial pattern that is first in the sewing order in the second embroidery pattern.

BRIEF DESCRIPTION OF TH DRAWINGS

Embodiments of the disclosure will be described below in detail with reference to the accompanying drawings in which.

DETAILED DESCRIPTION OF EMBODIMENT

An embodiment of the present disclosure will be explained with reference to the drawings.

A sewing system 30 will be explained with reference to FIG. 1.

Figure 1:
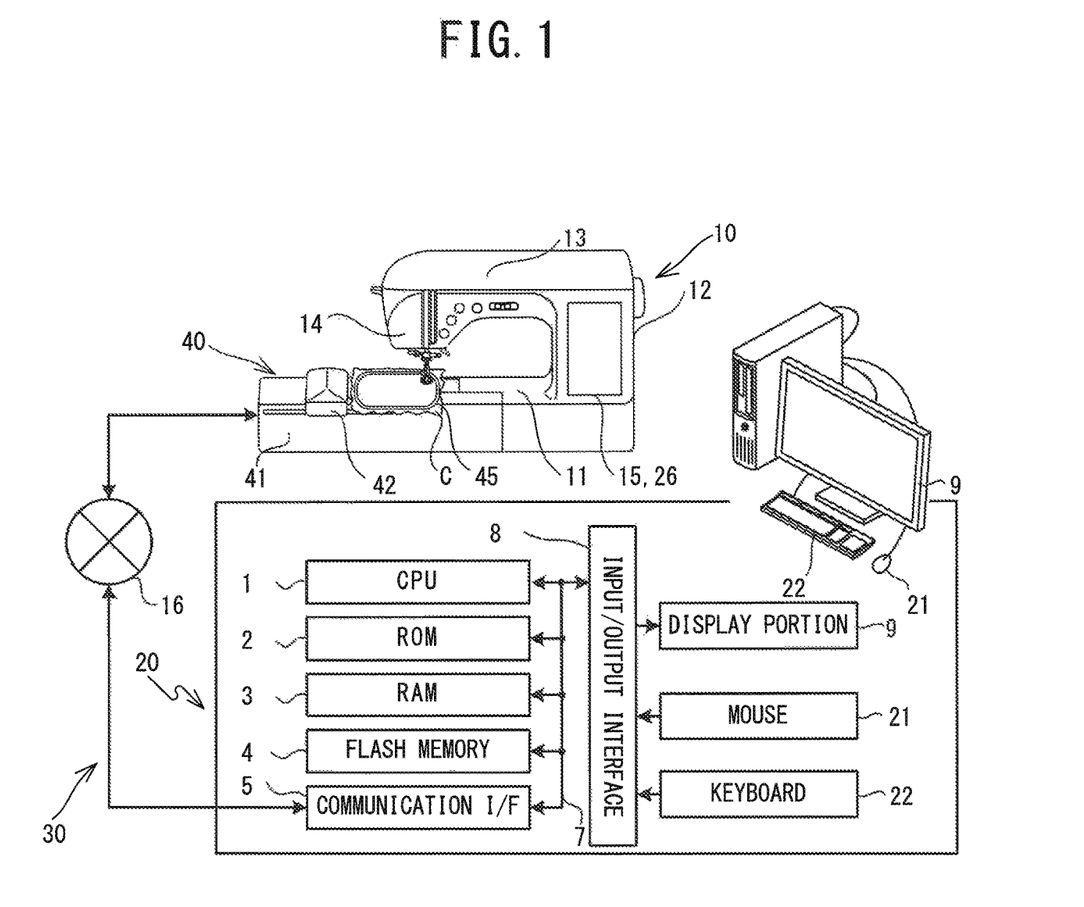
FIG. 1 is a schematic diagram of a sewing system 30 provided with a sewing machine 10 and a sewing data generation device 20.

As shown in FIG. 1, the sewing system 30 is provided with a sewing machine 10 and a sewing data generation device 20 (hereinafter referred to as the "device 20").

The sewing machine 10 is capable of embroidery sewing.

The device 20 is a well-known personal computer (PC), and is provided with a display portion 9, a mouse 21 and a keyboard 22.

1. Physical Configurations of Sewing Machine 10 and Embroidery Frame 45

As shown in FIG. 1, the sewing machine 10 is provided with a bed portion 11, a pillar 12, an arm portion 13, a head portion 14, and a movement mechanism 40. The bed portion 11 is a base portion of the sewing machine 10 and extends in the left-right direction. The pillar 12 is provided so as to extend upward from the right end portion of the bed portion 11. An LCD 15 and a touch panel 26 are provided on the front surface of the pillar 12. The arm portion 13 faces the bed portion 11 and extends to the left from the upper end of the pillar 12. The head portion 14 is a portion coupled to the left leading end portion of the arm portion 13. Although not shown in the drawings, the head portion 14 is provided with a needle bar, a presser bar, a needle bar up-and-down movement mechanism and the like. A sewing needle is detachably mounted on the lower end of the needle bar.

The movement mechanism 40 is configured such that it can relatively move a sewing object C, which is held by the embroidery frame 45, with respect to the needle bar. The movement mechanism 40 is provided with a main body case 41 and a carriage 42. When embroidery sewing is performed, a user mounts the embroidery frame 45 on the carriage 42. The embroidery frame 45 is moved to a needle drop point indicated by an XY coordinate system (an embroidery coordinate system) specific to the sewing machine 10, by a Y direction movement mechanism (not shown in the drawings) housed in the carriage 42 and an X direction movement mechanism (not shown in the drawings) housed in the main body case 41. The needle bar on which the sewing needle has been mounted and a shuttle mechanism (not shown in the drawings) are driven in accordance with the movement of the embroidery frame 45. Thus, an embroidery pattern is sewn on the sewing object C.

2. Electrical Configuration of Device 20

As shown in FIG. 1, the device 20 is provided with a CPU 1, a ROM 2, a RAM 3, a flash memory 4, a communication I/F 5 and an input/output interface 8. The CPU 1 performs overall control of the device 20. The CPU 1 is electrically connected to the ROM 2, the RAM 3, the flash memory 4, the communication I/F 5 and the input/output interface 8, via a bus 7. A boot program and a BIOS and the like are stored in the ROM 2. Temporary data is stored in the RAM 3. Various setting values are stored in the flash memory 4. The communication I/F 5 is an interface to connect the device 20 to a network 16. The CPU 1 can transmit and receive data to and from other devices (for example, the sewing machine 10) connected to the network 16, via the communication I/F 5. The input/output interface 8 is connected to the display portion 9, the mouse 21 and the keyboard 22. The display portion 9 is a liquid crystal display. The mouse 21 and the keyboard 22 are used to input various commands.

3. Outline of Processing Performed by Device 20

An outline of processing performed by the device 20 will be explained. In main processing of the device 20, a sewing order is set for a plurality of partial patterns included in the embroidery pattern, when a plurality of embroidery patterns selected by the user are sewn in order of each embroidery pattern. When setting the sewing order for the plurality of partial patterns, consideration is given to a type of thread used in sewing the partial patterns. "Sewing in order of each embroidery pattern" means that, after sewing is complete of all stitches included in an embroidery pattern that is N-th in the sewing order (where N is a natural number), the sewing is started of the embroidery pattern that is (N+1)-th in the sewing order. More specifically, the CPU 1 of the device 20 acquires pattern data for each of the plurality of embroidery patterns. The pattern data is data to sew the embroidery pattern including a plurality of partial patterns in which mutually different types of thread are used in the sewing. The pattern data include thread data indicating the type of thread, and coordinate data indicating positions of stitches sewn using the thread of the thread data, for each of the plurality of partial patterns. The CPU 1 determines whether first common data is included in first data and second data. The first data is pattern data of a first embroidery pattern, among the plurality of embroidery patterns. The second data is pattern data of a second embroidery pattern that is sewn subsequently to the first embroidery pattern, after the sewing of all the stitches included in the first embroidery pattern is complete. The first common data is thread data indicating the same type of thread. The type of thread of a present example is a thread color. The type of thread may be a material, a thickness, a manufacturer of the thread and the like. In the present example, the embroidery pattern that is N-th in the sewing order is the first embroidery pattern, and the embroidery pattern that is N+1-the in the sewing order is the second embroidery pattern. The sewing order of the plurality of embroidery patterns may be set in advance, or may be set in accordance with a predetermined method taking into consideration an arrangement and an overlapping order, and the like. The sewing order of the plurality of embroidery patterns may be set by the user. When it is determined that the first common data is included in the first data and the second data, the CPU 1 causes the partial pattern sewn using the thread of the first common data to be the partial pattern that is last in the sewing order of the first embroidery pattern, and sets the sewing order of the stitches (the needle drop points) represented by the first data. When it is determined that the first common data is included in the first data and the second data, the CPU 1 causes the partial pattern sewn using the thread of the first common data to be the partial pattern that is first in the sewing order in the second embroidery pattern, and sets the sewing order of the stitches represented by the second data.

4. Main Processing of First Embodiment

The main processing of the device 20 will be explained with reference to FIG. 2 to FIG. 6. The main processing is performed after the user has selected a target pattern to be sewn, and has input a type of embroidery frame that the user plans to use when sewing the target pattern, when a command is input to generate the pattern data of the target pattern to be sewn. The target pattern may be selected from a plurality of patterns stored in the flash memory 4, for example, or may be a graphic pattern drawn by the user. When the CPU 1 of the device 20 detects the generation command, a sewing data generation program that executes the main processing and that is stored in a program storage area of the ROM 2 is read out to the RAM 3. The CPU 1 performs the following steps in accordance with commands included in the sewing data generation program read out to the RAM 3. Various parameters needed for the execution of the main processing are stored in the flash memory 4. Various data obtained in the course of the main processing are stored in the RAM 3, as necessary.

Below, as a first example, a case will be explained in which a target pattern 50 (refer to FIG. 3) that is drawn by the user is selected. The target pattern 50 is of a size that is contained within a rectangular range R. The first example includes partial patterns E1, E2, E3, E4, and E5 that are sewn using mutually different thread colors. The partial pattern E1 is a pattern sewn using a thread of a first color shown by lattice shading. The partial pattern E1 includes a pattern E11 and a pattern E12 that are in mutually different areas represented by continuous stitches using the same type of thread. For example, the pattern E11 and the pattern E12 are sewn using the same type of thread, but are separated from each other, and are not formed using continuous stitches. Each of the pattern E11 and the pattern E12 has a circular shape. The partial pattern E2 is a pattern sewn using a thread of a second color shown by black dot shading. The partial pattern E2 includes patterns E21 and E22 of different areas. The pattern E21 has a circular shape, and the pattern E22 has a fan shape. The partial pattern E3 is a pattern sewn using a thread of a third color shown in black. The partial pattern E3 includes a pattern E31 and a pattern E32 that are in mutually different areas. The pattern E31 is disposed adjacent to the pattern E22 and is a fan-shaped pattern. The pattern E32 is a circular-shaped pattern. The partial pattern E4 is a pattern sewn using a fourth color shown by striped shading extending in the up-down direction in FIG. 3. The partial pattern E4 is an L-shaped pattern. The partial pattern E5 is a pattern sewn using a thread of a fifth color shown by striped shading extending in the left-right direction in FIG. 3. The partial pattern E5 is a circular-shaped pattern.

As a second example, a case will be explained in which a target pattern 60 (refer to FIG. 4) drawn by the user is selected. In the second example, the same reference numerals are assigned to the same patterns as in the first example. The target pattern 60 is of a size that is contained within the rectangular range R. The second example includes the partial patterns E4 and E5, partial patterns E6, E7, and the pattern E31. The partial pattern E6 is a pattern sewn using the thread of the first color. The partial pattern E6 includes the pattern E11 and a pattern E62 in mutually different areas. The pattern E62 is a circular-shaped pattern. The partial pattern E7 is a pattern sewn using the thread of the second color. The partial pattern E7 includes the pattern E21, a pattern E27, and a pattern E28. The pattern E27 is a fan-shaped pattern. The pattern E28 is a circular-shaped pattern. The partial pattern E31 is a pattern sewn using the thread of the third color. The processing relating to the first example and the processing relating to the second example are executed separately and at mutually different timings, but, in order to simplify the following explanation, the processing relating to the first example and the processing relating to the second example are explained in parallel. The left-right direction and the up-down direction shown in FIG. 3 and FIG. 4 respectively correspond to the X direction and the Y direction of the embroidery coordinate system.

Figure 2:
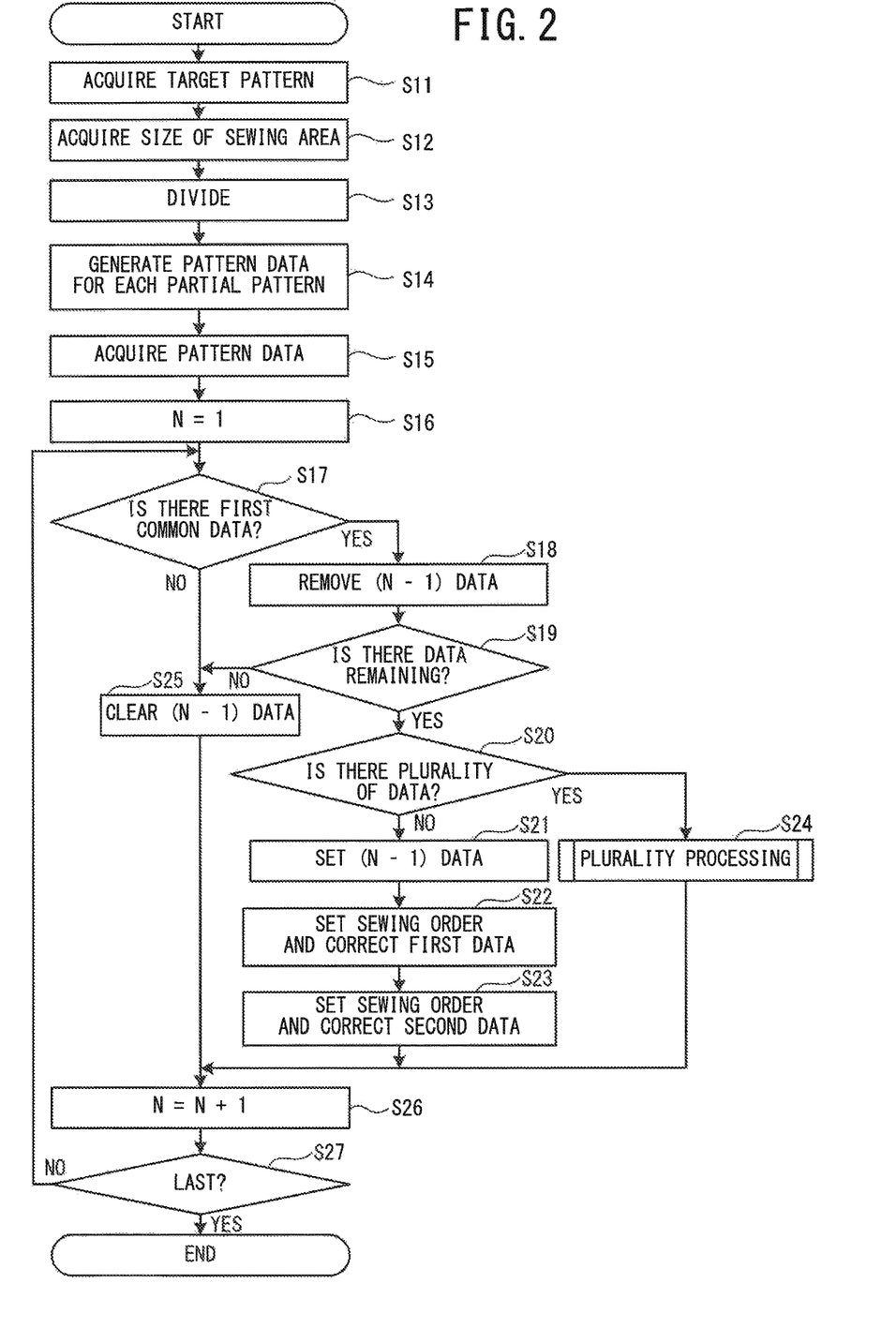
FIG. 2 is a flowchart of main processing performed by the sewing data generation device 20.

As shown in FIG. 2, the CPU 1 acquires the target pattern selected by the user (step S11). In the first example, the target pattern 50 is acquired. In the second example, the target pattern 60 is acquired. The CPU 1 acquires the size of a sewing area (step S12). The sewing area of the present examples is a rectangular area that is set inside the embroidery frame 45 and that has sides parallel to the X axis and sides parallel to the Y axis of the embroidery coordinate system. The size of a sewing area is represented by the length in an X direction and the length in a Y direction of the embroidery coordinate system. In the present examples, a correspondence relationship between the type of the embroidery frame and the size of the sewing area is stored in the flash memory 4. In the present examples, the size of a sewing area 46 corresponding to the type of the embroidery frame to be used to sew the target pattern that is input before starting the main processing is acquired. At step S12, the size of the sewing area 46 input by the user may be acquired.

In accordance with the size of the sewing area 46 acquired at step S12, the CPU 1 divides the target pattern into a plurality of divided patterns each of a size that is contained within the sewing area 46 (step S13). As a method for dividing the target pattern in accordance with the size of the sewing area 46 acquired at step S12, a known method (a method disclosed in Japanese Laid-Open Patent Publication No. 2000-24350, for example) may be adopted as appropriate. In the first example, the target pattern 50 is divided into four divided patterns 51, 52, 53, and 54, which are contained in divided areas P11, P12, P13, and P14, respectively, with line segments K1 and K2 as boundary lines. The line segment K1 divides the range R into two equal parts in the left-right direction. The line segment K2 divides the range R into two equal parts in the up-down direction. Each of the divided patterns may have a section that overlaps with another of the divided patterns. In the present examples, the CPU 1 sets the divided patterns so as to partially overlap with the adjacent divided patterns at the boundary lines.

Figure 3:
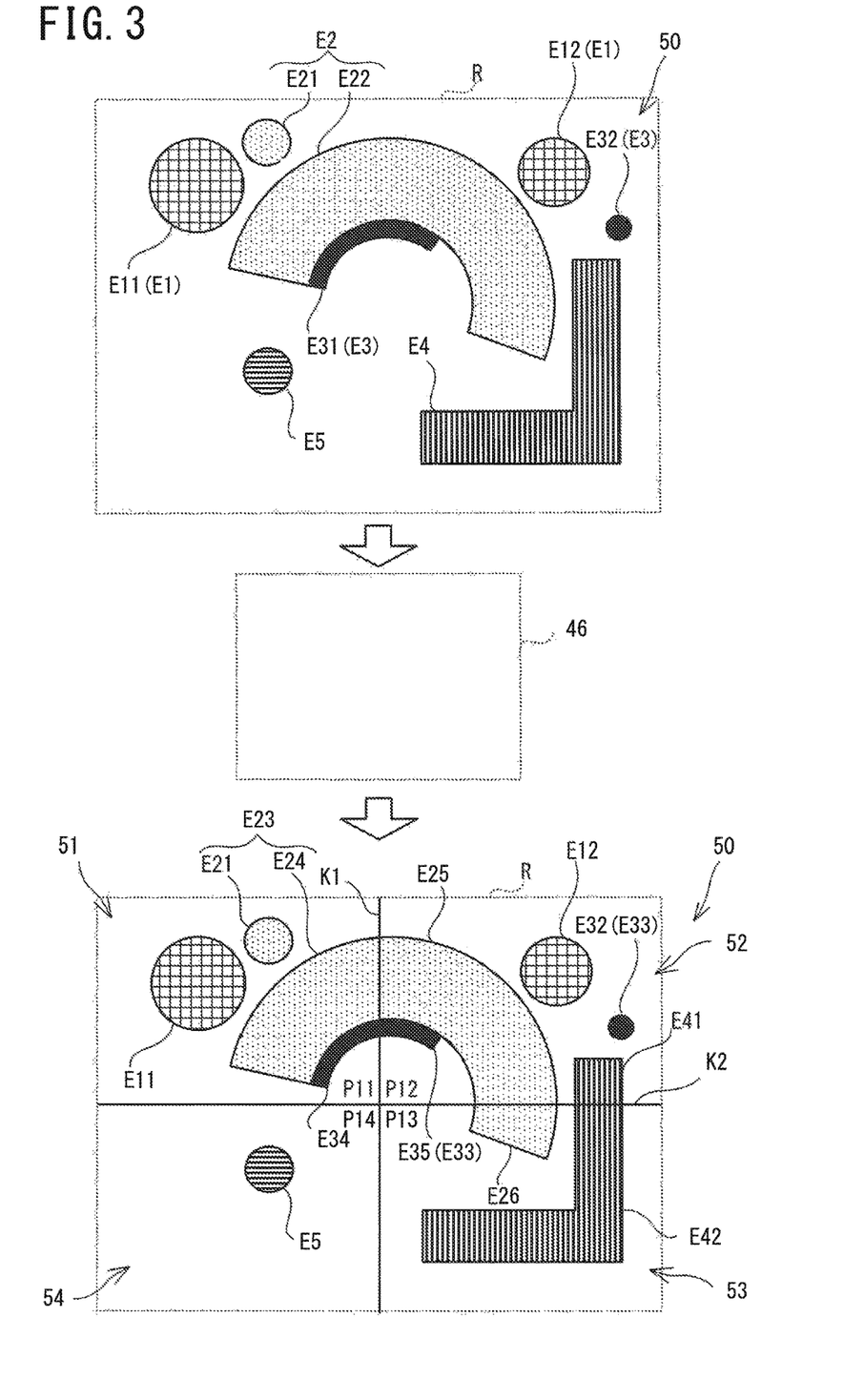
FIG. 3 is an explanatory diagram of a process in which a target pattern 50 of a first example is divided into a plurality of divided patterns 51, 52, 53, and 54, each of a size that is contained within a sewing area 46.

The divided pattern 51 includes the partial pattern E11, a partial pattern E23, and a partial pattern E34. The partial pattern E23 includes the pattern E21 and the pattern E24 that are in mutually different areas. The pattern E24 is a pattern contained within the divided area P11, of the three patterns formed by dividing the pattern E22 in positions indicated by the line segment K1 and the line segment K2. The partial pattern E34 is a pattern contained within the divided area P11, of the two patterns formed by dividing the pattern E31 in a position indicated by the line segment K1.

The divided pattern 52 includes the partial pattern E12, a partial pattern E25, a partial pattern E33, and a pattern E41. The partial pattern E25 is a pattern contained within the divided area P12, of the three patterns formed by dividing the pattern E22 at positions indicated by the line segment K1 and the line segment K2. The partial pattern E33 includes a pattern E35 and the pattern E32 that are in mutually different areas. The pattern E35 is a pattern contained within the divided area P12, of the two patterns formed by dividing the pattern E31 at a position indicated by the line segment K1. The pattern E41 is a pattern contained within the divided area P12, of the two patterns formed by dividing the partial pattern E4 at a position indicated by the line segment K2.

The divided pattern 53 includes a partial pattern E26 and a partial pattern E42. The partial pattern E26 is a pattern contained within the divided area P13, of the three patterns formed by dividing the pattern E22 at positions indicated by the line segment K1 and the line segment K2. The partial pattern E42 is a pattern contained within the divided area P13, of the two patterns formed by dividing the partial pattern E4 at a position indicated by the line segment K2. The divided pattern 54 includes the partial pattern E5.

Figure 4:
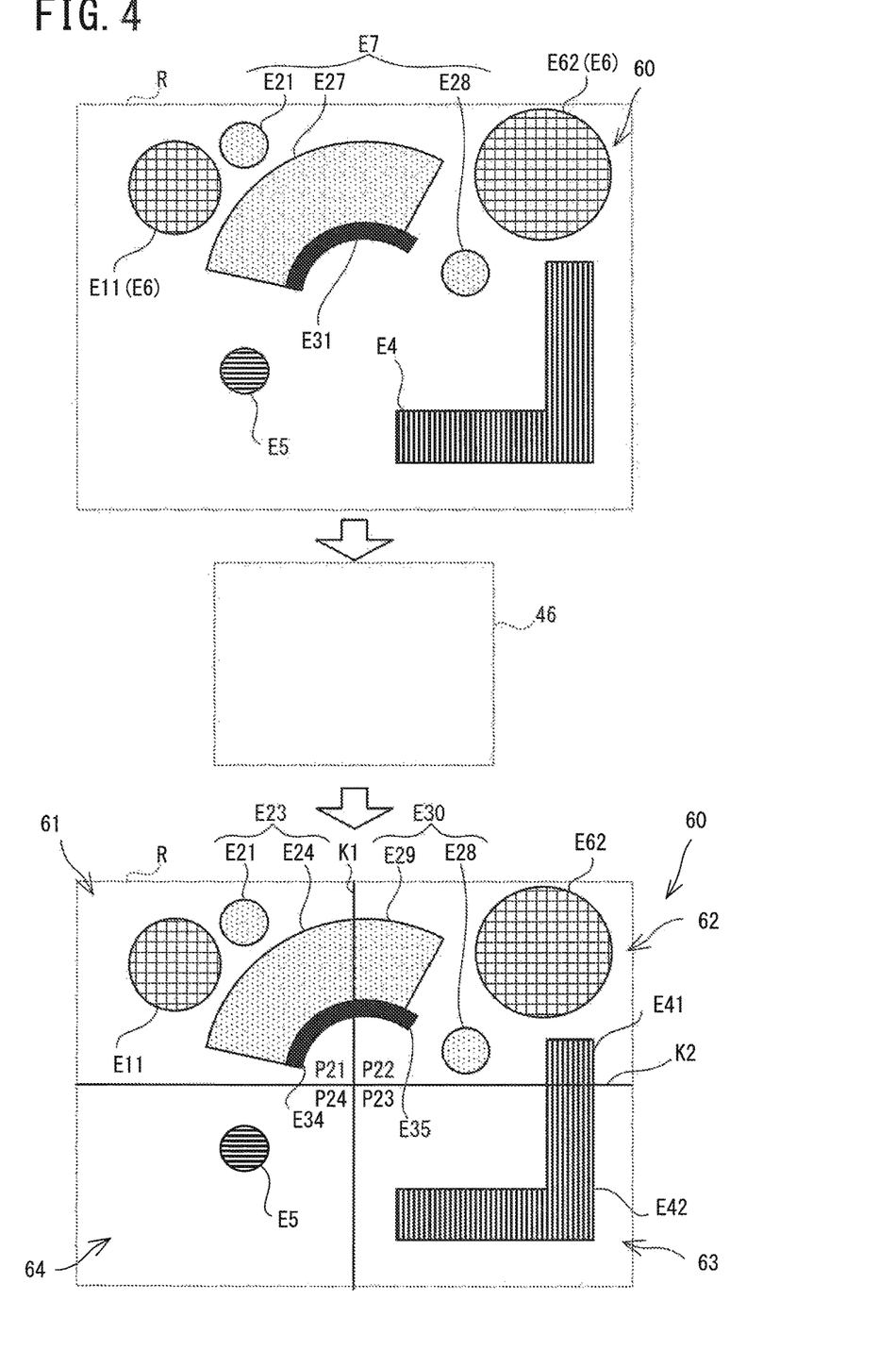
FIG. 4 is an explanatory diagram of a process in which a target pattern 60 of a second example is divided into a plurality of divided patterns 61, 62, 63, and 64, each of a size that is contained within the sewing area 46.

In a similar manner, in the second example, the target pattern 60 is divided into four divided patterns 61, 62, 63, and 64 which are contained within four divided areas P21, P22, P23, and P24, respectively, with the line segments K1 and K2 as boundary lines, in the same manner as the first example. The divided pattern 61 includes the partial pattern E11, the partial pattern E23 and the partial pattern E34. The divided pattern 62 includes a partial pattern E30, the partial pattern E35, the partial pattern E41, and the partial pattern E62. The partial pattern E30 includes a pattern E29 and a pattern E28. The divided pattern 63 includes the partial pattern E42. The divided pattern 64 includes the partial pattern E5.

The CPU 1 generates the pattern data for each of the plurality of divided patterns formed by the dividing in the processing at step S13 (step S14). The CPU 1 sets the sewing order of the plurality of divided patterns, and the sewing order of the plurality of partial patterns inside the divided patterns, and generates the pattern data on the basis of the set sewing orders. The sewing order of the plurality of divided patterns may be determined in accordance with a predetermined method. In the present examples, the divided pattern disposed top left is first in the sewing order, and, for the second in the sewing order onward, the sewing order is determined to be in the clockwise direction from the first divided pattern, in accordance with the layout of the divided areas. In other words, in the first example, the CPU 1 determines the sewing order to be in order of the divided patterns 51, 52, 53, and 54, in ascending order of the sewing order. In the second example, the CPU 1 determines the sewing order to be in order of the divided patterns 61, 62, 63, and 64, in ascending order of the sewing order.

Figure 5:
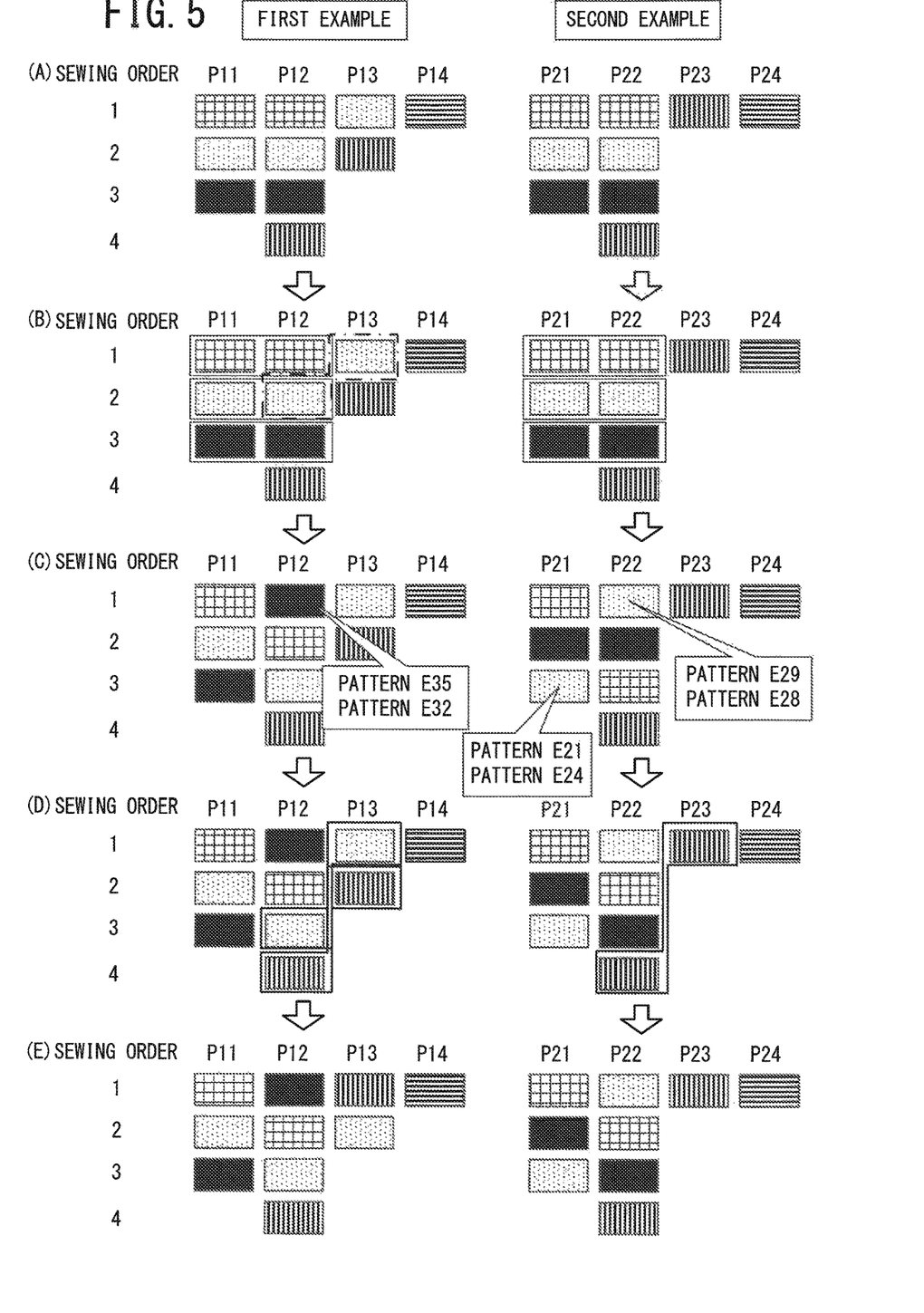
FIG. 5 is an explanatory diagram of processing to determine a sewing order of a plurality of partial patterns included in the target pattern 50 of the first example, on the basis of a type of thread used for sewing the partial patterns, and processing to determine a sewing order of a plurality of partial patterns included in the target pattern 60 of the second example, on the basis of the type of thread used for sewing the partial patterns.

The sewing order of the plurality of partial patterns inside the divided patterns may be determined in accordance with a predetermined method. In accordance with the thread data, the CPU 1 of the present examples sets the first color, the second color, the third color, the fourth color, and the fifth color as the thread data, in ascending order of the sewing order. Specifically, in the first example and the second example, the sewing order of the plurality of partial patterns is set as shown in FIG. 5 (A). In the divided pattern 51, the sewing order of the plurality of partial patterns is set as the partial pattern E11, the partial pattern E23, and the partial pattern E34, in ascending order of the sewing order. In the divided pattern 52, the sewing order of the plurality of partial patterns is set as the partial pattern E12, the partial pattern E25, the partial pattern E33, and the partial pattern E41, in ascending order of the sewing order. In the divided pattern 53, the sewing order of the plurality of partial patterns is set as the partial pattern E26, and the partial pattern E42, in ascending order of the sewing order. Since only the partial pattern E5 is included in the divided pattern 54, only the partial pattern E5 is set in the sewing order. The sewing order of the stitches inside the areas is set in accordance with a predetermined method.

In a similar manner, in the second example, in the divided pattern 61, the sewing order of the plurality of partial patterns is set as the partial pattern E11, the partial pattern E23, and the partial pattern E34, in ascending order of the sewing order. In the divided pattern 62, the sewing order of the plurality of partial patterns is set as the partial pattern E62, the partial pattern E30, the partial pattern E35, and the partial pattern E41, in ascending order of the sewing order. Since only the partial pattern E42 is included in the divided pattern 63, only the partial pattern E42 is set in the sewing order. Since only the partial pattern E5 is included in the divided pattern 64, only the partial pattern E5 is set in the sewing order.

The CPU 1 acquires the pattern data to sew each of the plurality of divided patterns generated by the processing at step S14, where the plurality of divided patterns are the plurality of embroidery patterns (step S15). The CPU 1 sets to 1 a variable N that is used to read out, in accordance with the sewing order, the divided patterns generated by the processing at step S13 (step S16). In the following explanation, the divided pattern that is N-th in the sewing order is also denoted as a divided pattern (N). The divided pattern (N) is also referred to as a first embroidery pattern. A divided pattern (N+1) is also referred to as a second embroidery pattern, and a divided pattern (N+2) is also referred to as a third embroidery pattern. After all the stitches included in the divided pattern (N) are sewn, the divided pattern (N+1) is sewn subsequently to the divided pattern (N). After all the stitches included in the divided pattern (N+1) are sewn, the divided pattern (N+2) is sewn subsequently to the divided pattern (N+1). The pattern data of the divided pattern (N) is first data, the pattern data of the divided pattern (N+1) is second data, and the pattern data of the divided pattern (N+2) is third data.

The CPU 1 determines whether the first common data is present in the divided pattern (N) and the divided pattern (N+1) (step S17). When the common partial pattern is distributed in both the divided pattern (N) and the divided pattern (N+1) by the dividing of the target pattern, the CPU 1 of the present examples determines that the first common data is included in the divided pattern (N) and the divided pattern (N+1). At step S17, it may be determined that the first common data is included when the same thread data is included in the first data and the second data. When the first common data is not included in the divided patter (N) and the divided pattern (N+1) (no at step S17), the CPU 1 clears data (N−1) (step S25), and performs processing at step S26 to be described later. The (N−1) data is the thread data that is set in the processing at step S21 or step S24 before the N-th cycle of processing, namely in the (N−1)-th processing, and is used in processing to correct the sewing order of the partial patterns and the areas inside the divided pattern. An initial value of the (N−1) data is a NULL value, and the thread data set in the (N−1) data is thread data corresponding to the partial pattern set as the partial pattern that is first in the sewing order in the divided pattern (N). The (N−1) data is set so as to avoid the thread data used in the processing to correct the sewing order of the partial patterns and the areas inside the divided pattern in the (N−1)-th processing of the preceding cycle from being used in processing to correct the sewing order of the partial patterns and the areas inside the divided pattern in the current N-th processing.

As shown in FIG. 5 (B), in each of the first example and the second example, when the variable N is 1, the CPU 1 determines that the thread data of each of the first color, the second color, and the third color are common to the first data and the second data (yes at step S17). In FIG. 5 (B), the first common data is surrounded by solid lines. In this case, the CPU 1 removes the (N−1) data from the first common data identified at step S17 (step S18). When the variable N is 1, the (N−1) data is the NULL value. The CPU 1 determines whether the thread data is remaining when the (N−1) data has been removed from the first common data identified at step S17 (step S19). When the thread data is not remaining (no at step S19), the CPU 1 performs processing at step S25 described above. When the variable N is 1, in each of the first example and the second example, the thread data of the first color, the second color, and the third color are present (yes at step S19). When the (N−1) data has been removed from the first common data identified at step S17, the CPU 1 determines whether there is a plurality of remaining data (step S20). When there is not the plurality of remaining data (no at step S20), the CPU 1 performs processing at step S21 to be described later. When the variable N is 1, in each of the first example and the second example, the thread data of each of the first color, the second color, and the third color are present (yes at step S20). In this case, since there is the plurality of thread data, the CPU 1 performs plurality processing (step S24).

Figure 6:
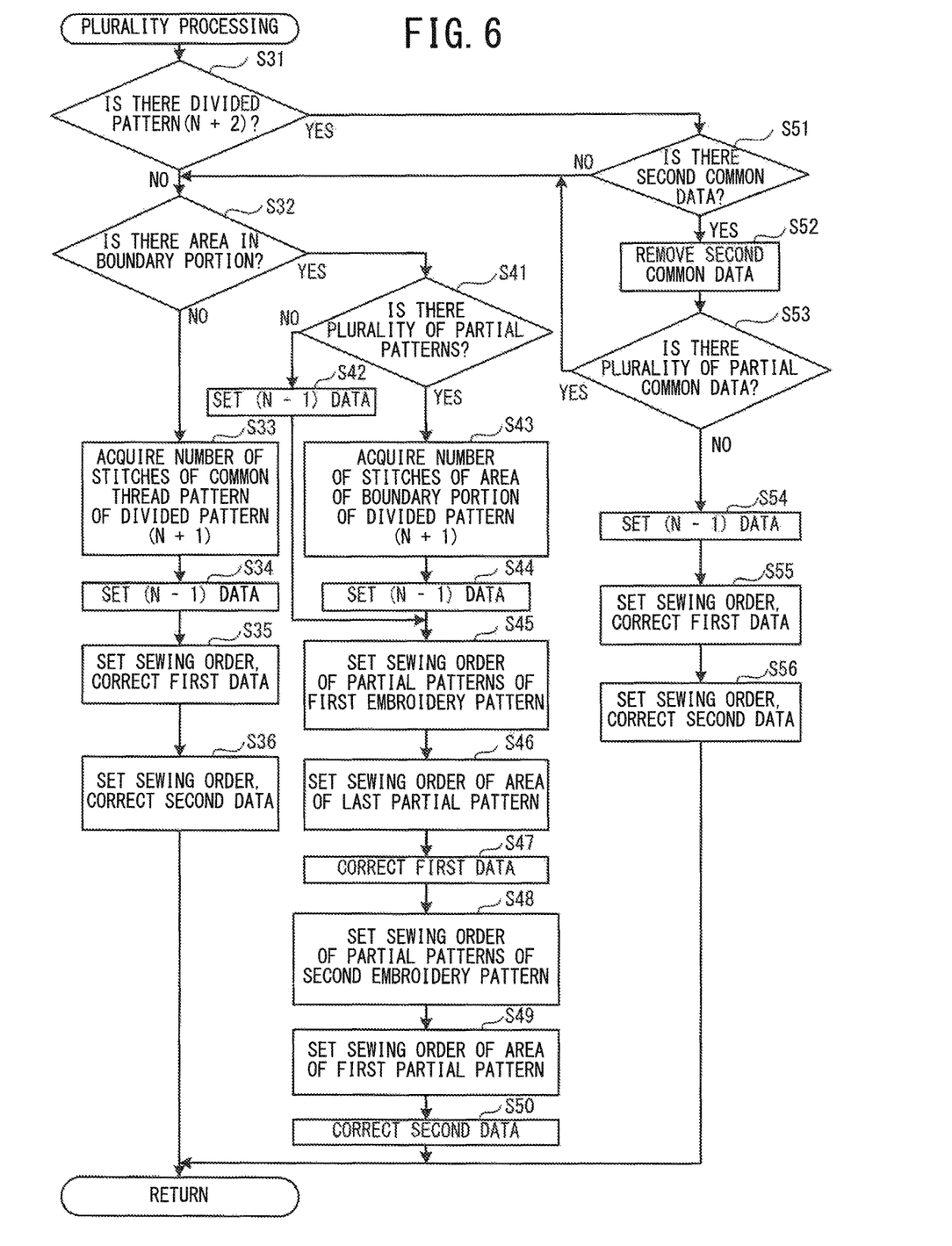
FIG. 6 is a flowchart of a plurality processing performed in the main processing shown in FIG. 2.

As shown in FIG. 6, in the plurality processing, the CPU 1 determines whether there is a divided pattern (N+2) (step S31). When the divided pattern (N+2) is not present (no at step S31), the CPU 1 performs processing at step S32 to be described later. In both the first example and the second example, when the variable N is 1, the divided pattern (N+2) is present (yes at step S31). In this case, the CPU 1 determines whether there is second common data (step S51). The second common data is thread data, of the first common data, included in the pattern data (the third data) of the divided pattern (N+2). In the second example, when the variable N is 1, all of the thread data of the first color, the second color, and the third color that are the first common data are not included in the pattern data of the divided pattern 63 (no at step S51). In this case, the CPU 1 performs processing at step S32 to be described later. In the first example, when the variable N is 1, the first common data is the thread data of the first color, the second color, and the third color. Of the first common data, the thread data of the second color, shown surrounded by alternate long and short dash lines in FIG. 5 (B), is included also in the pattern data of the divided pattern 53 (yes at step S51). In this case, the CPU 1 removes the second common data from the first common data (step S52). The CPU 1 determines whether a plurality of partial common data, which are thread data in which the second common data is removed from the first common data, are present (step S53).

When the plurality of partial common data are not present (no at step S53), the CPU 1 sets that partial common data as the (N−1) data (step S54). The CPU 1 finally sets the sewing order of a changed pattern inside the divided pattern (N), sets the sewing order of the stitches represented by the first data, and corrects the first data (step S55). The changed pattern is a partial pattern to be sewn using the thread of the (N−1) data. Specifically, of the sewing order of the partial patterns in the divided pattern (N) determined at step S14, the CPU 1 causes the changed pattern to be last in the sewing order. The sewing order of the other partial patterns is set forward as necessary, in accordance with the change in the sewing order of the changed pattern. The CPU 1 corrects the first data in accordance with the set sewing order. Next, the CPU 1 sets the changed pattern inside the divided pattern (N+1) to be first in the sewing order, sets the sewing order of the stitches represented by the second data, and corrects the second data (step S56). Specifically, of the sewing order of the partial patterns in the divided pattern (N+1) determined at step S14, the CPU 1 causes the changed pattern to be first in the sewing order. The sewing order of the other partial patterns is set back as necessary, in accordance with the change in the sewing order of the changed pattern. The CPU 1 corrects the second data in accordance with the set sewing order. At step S56, the CPU 1 causes data to be included in the second data, the data prompting the position of the sewing object C to be changed with respect to the embroidery frame 45. The data prompting the position of the sewing object C with respect to the embroidery frame 45 to be changed is described at the head of the second data, for example. The CPU 1 ends the plurality processing and returns the processing to the main processing shown in FIG. 2.

In the processing at step S53, in the first example, when the thread data of the second color that is the second common data is removed from the thread data of the first color, the second color, and the third color that are the first common data, the thread data of the first color and the third color remain (yes at step S53). When the plurality of thread data are remaining, the CPU 1 determines whether, in the partial patterns to be sewn using the thread of the partial common data, in the divided pattern (N+1), the partial pattern is present that includes an area in a boundary portion with the divided pattern (N) (step S32). The boundary portion is, for example, an area within a range of a predetermined distance (a 3 mm range, for example) from a line segment that is a boundary between the divided pattern (N) and the divided pattern (N+1). For example, when the pattern is divided at the position of the boundary (the line segment K1, for example) by the processing at step S13, the CPU 1 determines that there is the partial pattern including the area in the boundary portion between the divided pattern (N) and the divided pattern (N+1). At step S32, the CPU 1 may determine whether the partial pattern including the area in the boundary portion between the divided pattern (N) and the divided pattern (N+1) on the basis of a detection result of a pattern that is in the boundary portion.

When the variable N is 1 in the first example, the boundary between the divided pattern 51 and the divided pattern 52 is the line segment K1. In the first example, in the divided pattern 52, of the partial common data, the pattern E35 to be sewn using the thread data of the third color is in the boundary portion (yes at step S32). In this case, the CPU 1 determines whether a plurality of the partial patterns including the area in the boundary portion between the divided pattern (N) and the divided pattern (N+1) are present, among the partial patterns to be sewn using the thread of the partial common data (step S41). When the variable N is 1 in the first example, the CPU 1 determines that there is the one partial pattern including the area in the boundary portion (no at step S41), and sets the thread data of the third color, which is the thread data of the partial pattern E33 including the pattern E35 that is in the boundary portion, as the (N−1) data (step S42). The CPU 1 sets the changed pattern to be last in the sewing order in the divided pattern (N), and sets the sewing order of the partial patterns of the divided pattern (N) (step S45). Specifically, of the sewing order of the partial patterns in the divided pattern (N) determined at step S14, the CPU 1 causes the partial pattern E34 that is the changed pattern to be last in the sewing order. When the variable N is 1 in the first example, if the sewing order of the partial patterns inside the divided pattern 51 is expressed by the colors of the threads used in the sewing, the sewing order is, in ascending order, the first color, the second color, and the third color. In this case, the sewing order of the partial patterns is the same as that determined at step S14. Within the partial pattern that is last in the sewing order in the divided pattern (N), the CPU 1 sets the area that is in the boundary portion to be last in the sewing order, and sets the sewing order for each of the areas (step S46). The partial pattern E34 to be sewn using the thread of the third color does not include the plurality of areas, and thus, at step S46 in the first example, the sewing order of the areas is not set. The CPU 1 corrects the first data in accordance with the sewing order of the partial patterns in the divided pattern (N) set at step S45, and the sewing order of the areas inside the partial pattern that is last in the sewing order in the divided pattern (N) set at step S46 (step S47).

Inside the divided pattern (N+1), the CPU 1 sets the changed pattern to be first in the sewing order, and sets the sewing order of the partial patterns of the divided pattern (N+1) (step S48). Specifically, of the sewing order of the partial patterns in the divided pattern (N+1) determined at step S14, the CPU 1 causes the changed pattern to be first in the sewing order. The sewing order of the other partial patterns is set back as necessary, in accordance with the change in the sewing order of the changed pattern. When the variable N is 1 in the first example, if the sewing order of the partial patterns inside the divided pattern 52 is expressed by the colors of the threads used in the sewing, the sewing order is, in ascending order, the third color, the first color, the second color, and the fourth color. Within the partial pattern that is first in the sewing order in the divided pattern (N+1), the CPU 1 sets the area that is in the boundary portion to be first in the sewing order, and sets the sewing order for each of the areas of the partial pattern that is first in the sewing order in the divided pattern (N+1) (step S49). The partial pattern E33 to be sewn using the thread of the third color includes the pattern E35 and the pattern E32. When the variable N is 1 in the first example, the CPU 1 sets the pattern E35 that is in the boundary portion to be first in the sewing order, and sets the pattern E35 and the pattern E32 in ascending order in the sewing order. The CPU 1 corrects the second data in accordance with the sewing order of the partial patterns in the divided pattern (N+1) set at step S48, and the sewing order of the areas in the partial pattern that is first in the sewing order in the divided pattern (N+1) set at step S49 (step S50). At step S50, the CPU 1 causes data to be included in the second data, the data prompting the position of the sewing object C to be changed with respect to the embroidery frame 45. When the variable N is 1 in the first example, by the processing at step S47 and step S50, the sewing order of the partial patterns inside the divided pattern 51, and the sewing order of the partial patterns inside the divided pattern 52 are each corrected as shown in FIG. 5 (C). The CPU 1 ends the plurality processing and returns the processing to the main processing shown in FIG. 2.

In the second example, at step S32, in the partial common data, the pattern E29 and the pattern E35 that are to be sewn using the thread data of the third color are in the boundary portion (yes at step S32). The CPU 1 determines that there are the plurality of partial patterns of the divided pattern (N+1) including the areas in the boundary portion between the divided pattern (N) and the divided pattern (N+1), among the partial patterns to be sewn using the thread of the partial common data (yes at step S41). The CPU 1 acquires a number of stitches to sew the areas of the boundary portion, for each of the plurality of partial patterns including the areas that are in the boundary portion, in the divided pattern (N+1) (step S43). The CPU 1 acquires the number of stitches for each of the pattern E29 and the pattern E35 in the divided pattern 62. The CPU 1 sets, as the (N−1) data, the thread data corresponding to the area for which the number of stitches acquired at step S43 is greatest (most numerous data) (step S44). Of the pattern E29 and the pattern E35, the CPU 1 sets the thread data of the second color corresponding to the pattern E29 that has the greatest number of stitches, as the (N−1) data (step S44).

Of the sewing order of the partial patterns in the divided pattern (N) determined at step S14, the CPU 1 causes the partial pattern E23 of the second color to be last in the sewing order (step S45). When the variable N is 1 in the second example, if the sewing order of the partial patterns inside the divided pattern 61 is expressed by the colors of the threads used in the sewing, the sewing order is, in ascending order, the first color, the third color, and the second color. Within the partial pattern that is last in the sewing order, the CPU 1 sets the pattern E24 that is in the boundary portion to be last in the sewing order, and sets the sewing order for each of the areas to be the pattern E21 and the pattern E24 in ascending order in the sewing order (step S46). The CPU 1 corrects the first data in accordance with the sewing order of the partial patterns in the divided pattern (N) set at step S45, and the sewing order of the areas inside the partial pattern that is last in the sewing order in the divided pattern (N) set at step S46 (step S47).

Inside the divided pattern (N+1), the CPU 1 sets the partial pattern E30 to be sewn using the thread of the second color to be first in the sewing order, and sets the sewing order of the partial patterns of the divided pattern (N+1) (step S48). When the variable N is 1 in the second example, if the sewing order of the partial patterns inside the divided pattern 62 is expressed by the colors of the threads used in the sewing, the sewing order is, in ascending order, the second color, the first color, the third color, and the fourth color. Within the partial pattern E30 that is first in the sewing order, the CPU 1 sets the pattern E29 that is in the boundary portion to be first in the sewing order, and sets the sewing order for each of the areas to be the pattern E29 and the pattern E28 in ascending order in the sewing order (step S49). The CPU 1 corrects the second data in accordance with the sewing order of the partial patterns in the divided pattern (N+1) set at step S48, and the sewing order of the areas in the partial pattern that is first in the sewing order in the divided pattern (N+1) set at step S49 (step S50). At step S50, the CPU 1 causes the data to be included in the second data, the data prompting the position of the sewing object C to be changed with respect to the embroidery frame 45. When the variable N is 1 in the second example, by the processing at step S47 and step S50, the sewing order of the partial patterns inside the divided pattern 61, and the sewing order of the partial patterns inside the divided pattern 62 are each corrected as shown in FIG. 5 (C). The CPU 1 ends the plurality processing and returns the processing to the main processing shown in FIG. 2.

At step S32, when the area is not set in the boundary portion (no at step S32), the CPU 1 acquires the number of stitches of a common thread pattern of the divided pattern (N+1) (step S33). The common thread pattern is a partial pattern to be sewn using the thread of the partial common data. With respect to the common thread pattern of the divided pattern (N+1) acquired at step S33, the CPU 1 compares the number of stitches for each of the partial patterns, and sets the thread data corresponding to the partial pattern having the greatest number of stitches as the (N−1) data (step S34). Within the divided pattern (N), the CPU 1 sets the changed pattern to be last in the sewing order, and corrects the first data (step S35). Within the divided pattern (N+1), the CPU 1 sets the changed pattern to be first in the sewing order, and corrects the second data (step S36). At step S36, the CPU 1 causes the data to be included in the second data, the data prompting the position of the sewing object C to be changed with respect to the embroidery frame 45. The CPU 1 ends the plurality processing and returns the processing to the main processing in FIG. 2.

After the processing at step S24, the CPU 1 increments the variable N by 1 (step S26). The CPU 1 determines whether the divided pattern (N) is the divided pattern that is last in the sewing order (step S27). When the variable N is 2, the divided pattern is not last in the sewing order (no at step S27), and the CPU 1 returns the processing to step S17. When the variable N is that of the divided pattern that is last in the sewing order (yes at step S27), the CPU 1 ends the main processing.

When the variable N is 2 in the first example, it is determined that the thread data of the second color and the fourth color are present as the first common data, as surrounded by solid lines in FIG. 5 (D) (yes at step S17). In this case, the (N−1) data is the thread data of the third color, and even when the (N−1) data is removed from the first common data (step S18), there is the plurality of thread data (yes at step S19; yes at step S20). The CPU 1 determines that the divided pattern (N+2) is present (yes at step S31), but that the second common data is not present (no at step S51). The divided pattern 53 that is (N+1)-th in the sewing order includes the partial pattern E26 and the partial pattern E42 that are in the boundary portion (yes at step S32; yes at step S41). The CPU 1 acquires the number of stitches for each of the partial pattern E26 and the partial pattern E42 that are in the boundary portion, in the (N+1)-th divided pattern 53 (step S43), and sets the thread data of the fourth color corresponding to the partial pattern E42 that has the greatest number of stitches (the most numerous data), as the (N−1) data (step S44).

The CPU 1 causes the partial pattern E41 of the fourth color of the divided pattern 52 to be last in the sewing order (step S45). When the variable N is 2 in the first example, if the sewing order of the partial patterns inside the divided pattern 52 is expressed by the colors of the threads used in the sewing, the sewing order is, in ascending order, the third color, the first color, the second color and the fourth color. Since the partial pattern E41 that is last in the sewing order does not contain the plurality of areas, the CPU 1 does not set the sewing order of the areas (step S46). The CPU 1 corrects the first data in accordance with the sewing order of the partial patterns set at step S45, and the sewing order of the areas inside the partial pattern that is last in the sewing order set at step S46 (step S47).

Inside the divided pattern 53, the CPU 1 sets the partial pattern E42 to be sewn using the thread of the fourth color to be first in the sewing order, and sets the sewing order of the partial patterns of the divided pattern 53 to be the partial pattern E42 and the partial pattern E26 in ascending order in the sewing order (step S48). Since the partial pattern E42 that is first in the sewing order does not include the plurality of areas, the CPU 1 does not set the sewing order of the areas (step S49). The CPU 1 corrects the second data in accordance with the sewing order of the partial patterns set at step S48, and the sewing order of the areas in the partial pattern that is first in the sewing order set at step S49 (step S50). At step S50, the CPU 1 causes the data to be included in the second data, the data prompting the position of the sewing object C to be changed with respect to the embroidery frame 45. When the variable N is 2 in the first example, by the processing at step S47 and step S50, the sewing order of the partial patterns inside the divided pattern 52, and the sewing order of the partial patterns inside the divided pattern 53 are each corrected as shown in FIG. 5 (E). The CPU 1 ends the plurality processing and returns the processing to the main processing shown in FIG. 2.

When the variable N is 2 in the second example, the thread data of the fourth color is determined to be present as the first common data, as surrounded by solid lines in FIG. 5 (D) (yes at step S17). The (N−1) data is the thread data of the second color, and even when the (N−1) data is removed from the first common data (step S18), the thread data is remaining (yes at step S19; no at S20). The CPU 1 sets, as the (N−1) data, the thread data of the fourth color that is the first common data from which the (N−1) data is removed at step S18 (step S21). The CPU 1 causes the partial pattern E41 of the fourth color of the divided pattern 62 to be last in the sewing order, sets the sewing order of the stitches represented by the first data, and corrects the first data (step S22). When the variable N is 2 in the second example, if the sewing order of the partial patterns inside the divided pattern 62 is expressed by the colors of the threads used in the sewing, the sewing order is, in ascending order, the second color, the first color, the third color, and the fourth color. The CPU 1 corrects the first data in accordance with the sewing order of the partial patterns.

Inside the divided pattern 63, the CPU 1 sets the partial pattern E42 to be sewn using the thread of the fourth color to be first in the sewing order, sets the sewing order of the stitches represented by the second data, and corrects the second data (step S23). At step S23, the CPU 1 causes data to be included in the second data, the data prompting the position of the sewing object C to be changed with respect to the embroidery frame 45. When the variable N is 2 in the second example, by the processing at step S22 and step S23, the sewing order of the partial patterns inside the divided pattern 62, and the sewing order of the partial patterns inside the divided pattern 63 are respectively set as shown in FIG. 5 (E). In the present example, the sewing order of the partial patterns of the divided pattern 62 and the partial patterns of the divided pattern 63 is not changed in actuality by the processing at step S22 and step S23.

When the variable N is 3 in the first example and the second example, it is determined that the first common data is not present (no at step S17). When it is determined that the first common data is not present, the CPU 1 clears the (N−1) data (step S25), and increments the variable N by 1 (step S25). The CPU 1 determines that 4-th in the sewing order is last in the sewing order (yes at step S27), and ends the main processing.

When the main processing is performed in accordance with the sewing data generation program, the device 20 can set the sewing order of the stitches represented by the pattern data such that after all the stitches included in the first embroidery pattern are sewn, the sewing of the second embroidery pattern can be immediately started using the thread used to sew the first embroidery pattern. For example, in the first example, the user does not need to replace the thread when sewing the partial pattern E33 that is first in the sewing order in the divided pattern 52, after sewing the partial pattern E34 that is last in the sewing order in the divided pattern 51, namely, after the sewing of all the stitches included in the partial pattern 51 is complete. Similarly, the user does not need to replace the thread when sewing the partial pattern E42 that is first in the sewing order in the divided pattern 53, after sewing the partial pattern E41 that is last in the sewing order in the divided pattern 52, namely, after the sewing of all the stitches included in the divided pattern 52 is complete. According to the device 20, when the plurality of embroidery patterns are sewn continuously, one by one, the sewing order that allows efficient sewing can be set by taking the thread data into account.

When there is the plurality of first common data (yes at step S20), the device 20 determines whether one of the plurality of first common data is included in the third data, which is the pattern data of a third embroidery pattern to be sewn subsequently to the second embroidery pattern (step S51). When it is determined that the second common data is included (yes at step S51), the device 20 sets the partial pattern to be sewn using the thread of the partial common data as the partial pattern that is last in the sewing order in the first embroidery pattern, and sets the sewing order of the stitches represented by the first data (step S55, and step S35 and step S45 after passing through step S52). The partial common data is the thread data in which, of the first common data, the second common data that is the thread data included in the pattern data of the third embroidery pattern is removed from the first common data. When it is determined that the second common data is included, the device 20 sets the partial pattern to be sewn using the thread of the partial common data to be the partial pattern that is first in the sewing order in the second embroidery pattern, and sets the sewing order of the stitches represented by the second data (step S56, and step S36 and step S48 after passing through step S52). Thus, when the first embroidery pattern, the second embroidery pattern, and the third embroidery pattern are sewn, the device 20 can set the sewing order of the plurality of partial patterns of each of the embroidery patterns while taking sewing efficiency into account. Each time the embroidery pattern is switched, it is possible to cause the sewing of the embroidery pattern that is next in the sewing order to be started using the thread used to sew the embroidery pattern sewn directly before.

When there is the plurality of first common data (yes at step S20), the device 20 acquires the number of stitches in each of the partial patterns of the second embroidery pattern, for each of the plurality of first common data (step S33). The device 20 sets the partial pattern to be sewn using the thread of the most numerous data, which indicates the color of the thread data having the greatest number of stitches, in the first common data, as the partial pattern that is last in the sewing order in the first embroidery pattern, and corrects the first data (step S35). The device 20 sets the partial pattern to be sewn using the thread of the most numerous data as the partial pattern that is first in the sewing order in the second embroidery pattern, and sets the sewing order of the stitches represented by the second data (step S36). When the sewing machine 10 has sewn the plurality of embroidery patterns on the work cloth C in accordance with the pattern data corrected by the device 20, it is unlikely that there is displacement in a sewing position due to shrinkage in a section on which the second embroidery pattern is sewn.

The device 20 acquires the target pattern including the plurality of partial patterns (step S11), and acquires the size of the sewing area corresponding to the embroidery frame to be used to sew the target pattern (step S12). In accordance with the acquired size of the sewing area, the CPU 1 of the device 20 divides the target pattern into the plurality of partial patterns, each of a size that is contained with the sewing area (step S13). The CPU 1 of the device 20 sets the sewing order of the plurality of divided patterns generated by the division, generates the pattern data for each of the plurality of divided patterns, and acquires the pattern data to sew each of the plurality of divided patterns, the plurality of divided patterns being the plurality of embroidery patterns. When both the first embroidery pattern and the second embroidery pattern include the common partial pattern distributed by the division of the target pattern, the device 20 determines that the first common data is included. The device 20 can divide the target pattern into the divided patterns of the size that is contained within the sewing area. The device 20 can determine whether the first common data is included, on the basis of whether the partial pattern is distributed in a plurality of the divided patterns. In this case, the first common data is the thread data of the partial pattern that is distributed in the plurality of divided patterns.

When there is the plurality of the areas (simply the patterns in the above-described embodiment) to be sewn using the thread of the first common data, of the plurality of areas, the CPU 1 of the device 20 sets the area disposed in the boundary portion with the second embroidery pattern to be last in the sewing order, and sets the sewing order of the stitches represented by the first data. By sewing the area disposed in the boundary portion last, inside the first embroidery pattern, the device 20 can reduce the influence of shrinkage of the work cloth C on the stitches formed in the area disposed in the boundary portion. In other words, the device 20 can generate the pattern data that improves the finish of the stitches in the boundary portion.

When there is the plurality of areas to be sewn using the thread of the first common data, of the plurality of areas, the CPU 1 of the device 20 sets the area disposed in the boundary portion with the first embroidery pattern to be first in the sewing order, and sets the sewing order of the stitches represented by the second data. When the plurality of embroidery patterns are generated in accordance with the pattern data generated by the device 20, since the area disposed in the boundary portion is sewn first, inside the second embroidery pattern, the device 20 can reduce the influence of the shrinkage of the work cloth C on the stitches formed in the area disposed in the boundary portion. In other words, the device 20 can generate the pattern data that improves the finish of the stitches in the boundary portion.

The CPU 1 of the device 20 sets the partial pattern including the area disposed in the boundary portion with the first embroidery pattern to be earlier in the sewing order than the partial pattern that does not include the area disposed in the boundary portion with the first embroidery pattern, and sets the sewing order of the stitches included in the second data (step S49). When the plurality of embroidery patterns are generated in accordance with the pattern data generated by the device 20, within the second embroidery pattern, the partial pattern disposed in the boundary portion is sewn before the partial pattern that is not disposed in the boundary portion. Thus, the device 20 can reduce the influence of the shrinkage of the work cloth C on the stitches formed in the area disposed in the boundary portion. In other words, the device 20 can generate the pattern data that improves the finish of the stitches in the boundary portion.

The CPU 1 of the device 20 sets the sewing order of the partial pattern including the area disposed in the boundary portion with the second embroidery pattern to be after the sewing order of the partial pattern that does not include the area disposed in the boundary portion with the second embroidery pattern, and sets the sewing order of the stitches represented by the first data (step S46). When the plurality of embroidery patterns are generated in accordance with the pattern data generated by the device 20, within the first embroidery pattern, the partial pattern disposed in the boundary portion is sewn after the partial pattern that is not disposed in the boundary portion. Thus, the device 20 can reduce the influence of the shrinkage of the work cloth C on the stitches formed in the area disposed in the boundary portion. In other words, the device 20 can generate the pattern data that improves the finish of the stitches in the boundary portion.

The CPU 1 of the device 20 causes the data to be included in either the first data or the second data, the data prompting the position of the sewing object C to be changed with respect to the embroidery frame 45. When the single embroidery pattern is generated in accordance with the pattern data generated by the device 20, the sewing machine 10 can perform notification processing prompting the position of the sewing object C to be changed with respect to the embroidery frame 45, on the basis of the pattern data. The user can change the position of the sewing object C with respect to the embroidery frame 45 at an appropriate timing, in accordance with the notification by the sewing machine 10. The CPU 1 corrects the first data in accordance with the setting of the sewing order of the stitches represented by the first data (step S22, step S35, step S47, and step S55). The CPU 1 corrects the second data in accordance with the setting of the sewing order of the stitches represented by the second data (step S23, step S36, step S50, and step S56). Thus, for the plurality of embroidery patterns for which the sewing order of the stitches represented by the first data is set using the method determined in advance, the CPU 1 of the device 20 can correct the sewing order of the stitches while taking the sewing efficiency into account.

The non-transitory computer-readable medium storing computer-readable instructions and the sewing data generation device of the present disclosure are not limited to the above-described embodiment, and various modifications may be made insofar as they do not depart from the scope and spirit of the present disclosure. For example, the following modifications (A) to (C) may be made as appropriate.

(A) The configuration of the device 20 may be changed as appropriate. The device 20 may be a dedicated device, or may be a portable terminal device, such as a smart phone, a tablet PC, or the like. The device 20 may be provided in the sewing machine 10. It is sufficient that the sewing machine 10 be capable of sewing the embroidery pattern, and the sewing machine 10 may be an industrial sewing machine or a multi-needle sewing machine.

(B) The program including the commands to cause the main processing (refer to FIG. 2 and FIG. 7) to be performed by the device 20 may be stored in an external device of the device 20 until the program is executed by the CPU 1. Thus, an acquisition method of the program, an acquisition path, and a device on which the program is stored may each be changed as appropriate. The program that is executed by the CPU 1 may be received via a cable or via wireless communication from another device, and may be stored in a storage device, such as a flash memory. Examples of the other device include a PC, and a server that is connected via a network.

(C) The respective steps of the main processing (refer to FIG. 2) performed by the device 20 are not limited to the example in which they are performed by the CPU 1, and a part or all of the steps may be performed by another electronic device (an ASIC, for example). The respective steps of the main processing may be performed through distributed processing by a plurality of electronic devices (a plurality of CPUs, for example). The respective steps of the main processing can be changed in order, omitted or added, as necessary. An aspect in which an operating system (OS) or the like operating on the device 20 performs a part or all of the main processing on the basis of a command from the CPU 1 is also included in the scope of the present disclosure. For example, the following modifications from (C-1) to (C-3) may be added to the main processing, as appropriate.

(C-1) When there is the plurality of first common data (yes at step S20), the CPU 1 of the device 20 need not necessarily determine whether there is the second common data. In this case, the CPU 1 may select one of the first common data using a predetermined method and set the selected first common data as the (N−1) data. The device 20 may set the partial pattern to be sewn using the thread of the second common data to be the partial pattern that is last in the sewing order in the second embroidery pattern. In this case, by setting the partial pattern to be sewn using the thread of the second common data to be the partial pattern that is first in the sewing order in the third embroidery pattern, the pattern data is generated that takes the sewing order into account. When there is the plurality of first common data, the device 20 need not necessarily acquire, for each of the plurality of first common data, the number of stitches for each of the partial patterns of the second embroidery pattern. In other words, the device 20 need not necessarily set the partial pattern to be sewn using the thread of the most numerous data to be the partial pattern that is last in the sewing order in the first embroidery pattern.

(C-2) The CPU 1 of the device 20 need not necessarily acquire the target pattern including the plurality of partial patterns (step S11) and acquire the size of the sewing area corresponding to the embroidery frame to be used in the sewing of the target pattern (step S12). The CPU 1 of the device 20 need not necessarily divide the target pattern into the plurality of divided patterns each of which is of the size that is contained within the sewing area, in accordance with the acquired size of the sewing area (step S13). The CPU 1 of the device 20 may acquire a plurality of the embroidery patterns, each of which is contained within the sewing area. For example, the CPU 1 of the device 20 may apply the processing of the above-described embodiment when, after sewing all the stitches included in the first embroidery pattern, the second embroidery pattern is sewn subsequent to the first embroidery pattern so as to partially overlap with the first embroidery pattern. The CPU 1 of the device 20 need not necessarily take the size of the sewing area into account. When dividing the target pattern into the plurality of divided patterns, the CPU 1 of the device 20 need not necessarily generate the pattern data including the sewing order of the stitches in order to sew each of the plurality of divided patterns at step S14. The sewing order of the stitches need not necessarily be included in the pattern data acquired at step S15. In this case, for example, in the processing to correct the first data of the above-described embodiment, the first data including the sewing order of the stitches may be generated, and, in the processing to correct the second data, the second data including the sewing order of the stitches may be generated. The CPU 1 of the device 20 need not necessarily set the sewing order of the plurality of divided patterns generated by the division, generate the pattern data for each of the plurality of divided patterns, and acquire the pattern data to sew each of the plurality of divided patterns where the plurality of divided patterns are the plurality of embroidery patterns. When both the first embroidery pattern and the second embroidery pattern include the common partial pattern distributed by the division of the target pattern, the device 20 need not necessarily determine whether the first common data is included.

(C-3) When there is the plurality of areas to be sewn using the thread of the first common data, of the plurality of areas, the CPU 1 of the device 20 need not necessarily set the area disposed in the boundary portion with the second embroidery pattern to be last in the sewing order and set the sewing order of the stitches represented by the first data. When there is the plurality of areas to be sewn using the thread of the first common data, of the plurality of areas, the CPU 1 of the device 20 need not necessarily set the area disposed in the boundary portion with the first embroidery pattern to be first in the sewing order and set the sewing order of the stitches represented by the second data. The CPU 1 of the device 20 need not necessarily set the sewing order of the partial pattern including the area disposed in the boundary portion with the first embroidery pattern to be before the sewing order of the partial pattern that does not include the area disposed in the boundary portion with the first embroidery pattern and set the sewing order of the stitches represented by the second data. The CPU 1 of the device 20 need not necessarily set the sewing order of the partial pattern including the area disposed in the boundary portion with the second embroidery pattern to be after the sewing order of the partial pattern that does not include the area disposed in the boundary portion with the second embroidery pattern and set the sewing order of the stitches represented by the first data. The CPU 1 of the device 20 need not necessarily cause the data to be included in at least one of the first data and the second data, the data prompting the position of the sewing object C to be changed with respect to the embroidery frame 45. The CPU 1 of the device 20 may cause the data prompting the position of the sewing object C to be changed with respect to the embroidery frame 45 to be included in both the first data and the second data.

What is claimed is:

1. A non-transitory computer-readable medium storing computer-readable instructions for sewing data generation that are executed by a processor provided in a sewing data generation device, the computer-readable instructions performing processes comprising:

acquiring, for each of a plurality of embroidery patterns, pattern data to sew the embroidery pattern including a plurality of partial patterns which are sewn using mutually different types of thread, the pattern data including thread data and coordinate data, the thread data indicating the type of the thread for each of the plurality of partial patterns, and the coordinate data indicating positions of stitches to be sewn using the thread of the thread data;

determining whether first common data, which is the thread data indicating the same type of thread, is included in first data and second data of the plurality of embroidery patterns, the first data being the pattern data of a first embroidery pattern, the second data being the pattern data of a second embroidery pattern, and the second embroidery pattern being the embroidery pattern that is sewn subsequently to the first embroidery pattern, after all the stitches included in the first embroidery pattern are sewn;

setting, when it is determined that the first common data is included in the first data and the second data, a sewing order of the stitches represented by the first data, while causing the partial pattern to be sewn using the thread of the first common data to be the partial pattern that is last in the sewing order in the first embroidery pattern; and setting, when it is determined that the first common data is included in the first data and the second data, a sewing order of the stitches represented by the second data, while causing the partial pattern to be sewn using the thread of the first common data to be the partial pattern that is first in the sewing order in the second embroidery pattern.

2. The non-transitory computer-readable medium according to claim 1, wherein the computer-readable instructions further perform a process comprising:

determining, when there is a plurality of the first common data, whether one of the plurality of first common data is included in third data, the third data being the pattern data of a third embroidery pattern to be sewn subsequently to the second embroidery pattern, after all the stitches included in the second embroidery pattern are sewn, the setting of the sewing order of the stitches represented by the first data includes, when it is determined that one of the plurality of first common data is included in the third data, causing the partial pattern to be sewn using the thread of partial common data to be the partial pattern that is last in the sewing order in the first embroidery pattern, the partial common data being the thread data in which second common data is removed from the first common data, and the second common data being the thread data, of the first common data, that is included in the pattern data of the third embroidery pattern, and the setting of the sewing order of the stitches represented by the second data includes, when it is determined that one of the plurality of first common data is included in the third data, causing the partial pattern to be sewn using the thread of the partial common data to be the partial pattern that is first in the sewing order in the second embroidery pattern.

3. The non-transitory computer-readable medium according to claim 1, wherein the computer-readable instructions further perform a process comprising:

acquiring, when there is a plurality of the first common data, a number of stitches of each of the partial patterns in the second embroidery pattern, for each of the plurality of first common data, the setting of the sewing order of the stitches represented by the first data includes causing the partial pattern to be sewn using the thread of most numerous data to be the partial pattern that is last in the sewing order in the first embroidery pattern, the most numerous data indicating a color of the thread data having the greatest number of stitches, in the first common data, and the setting of the sewing order of the stitches represented by the second data includes causing the partial pattern to be sewn using the thread of the most numerous data to be the partial pattern that is first in the sewing order in the second embroidery pattern.

4. The non-transitory computer-readable medium according to claim 1, wherein the computer-readable instructions further perform processes comprising:

acquiring a target pattern including the plurality of partial patterns;

acquiring a size of a sewing area corresponding to an embroidery frame used in sewing of the target pattern;

dividing the target pattern into a plurality of divided patterns each of a size to be contained within the sewing area, in accordance with the acquired size of the sewing area; and setting a sewing order of the plurality of divided patterns generated by the dividing, and generating the pattern data for each of the plurality of divided patterns, the acquiring of the pattern data for each of the plurality of embroidery patterns includes acquiring the pattern data to sew each of the generated plurality of divided patterns, where the plurality of divided patterns are the plurality of embroidery patterns, and the determining whether the first common data is included in the first data and the second data includes determining that the first common data is included when there is the common partial pattern distributed in both the first embroidery pattern and the second embroidery pattern by the dividing of the target pattern.

5. The non-transitory computer-readable medium according to claim 4, wherein
when there is a plurality of areas to be sewn using the thread of the first common data, the setting of the sewing order of the stitches represented by the first data includes setting the area, of the plurality of areas, that is disposed in a boundary portion with the second embroidery pattern to be last in the sewing order.

6. The non-transitory computer-readable medium according to claim 4, wherein
when there is a plurality of areas to be sewn using the thread of the first common data, the setting of the sewing order of the stitches represented by the second data includes setting the area, of the plurality of areas, that is disposed in a boundary portion with the first embroidery pattern to be first in the sewing order.

7. The non-transitory computer-readable medium according to claim 4, wherein
the setting of the sewing order of the stitches represented by the second data includes setting the sewing order of the partial pattern that includes an area disposed in a boundary portion with the first embroidery pattern to be before the sewing order of the partial pattern that does not include the area disposed in the boundary portion with the first embroidery pattern.

8. The non-transitory computer-readable medium according to claim 4, wherein
the setting of the sewing order of the stitches represented by the first data includes setting the sewing order of the partial pattern that includes an area disposed in a boundary portion with the second embroidery pattern to be after the sewing order of the partial pattern that does not include the area disposed in the boundary portion with the second embroidery pattern.

9. The non-transitory computer-readable medium according to claim 4, wherein
the computer-readable instructions further perform a process comprising:
causing data to be included in at least one of the first data and the second data, the data prompting a position of a sewing object to be changed with respect to the embroidery frame.

10. A sewing data generation device comprising:
a processor; and
a memory storing computer-readable instructions that, when executed by the processor, perform processes comprising:
acquiring, for each of a plurality of embroidery patterns, pattern data to sew the embroidery pattern including a plurality of partial patterns which are sewn using mutually different types of thread, the pattern data including thread data and coordinate data, the thread data indicating the type of the thread for each of the plurality of partial patterns, and the coordinate data indicating positions of stitches to be sewn using the thread of the thread data;
determining whether first common data is included in the pattern data of a first embroidery pattern and the pattern data of a second embroidery pattern, of the plurality of embroidery patterns, the second embroidery pattern being the embroidery pattern that is sewn subsequently to the first embroidery pattern, and the first common data being the thread data indicating the same type of thread;
setting, when it is determined that the first common data is included in the pattern data of the first embroidery pattern and the pattern data of the second embroidery pattern, a sewing order of the stitches represented by the pattern data of the first embroidery pattern, while causing the partial pattern to be sewn using the thread of the first common data to be the partial pattern that is last in the sewing order in the first embroidery pattern; and
setting, when it is determined that the first common data is included in the pattern data of the first embroidery pattern and the pattern data of the second embroidery pattern, a sewing order of the stitches represented by the pattern data of the second embroidery pattern, while causing the partial pattern to be sewn using the thread of the first common data to be the partial pattern that is first in the sewing order in the second embroidery pattern.

* * * * *